No. 614,274. Patented Nov. 15, 1898.
J. M. POPE.
TAX BILL COMPUTATOR.
(Application filed Mar. 8, 1898.)
(No Model.)
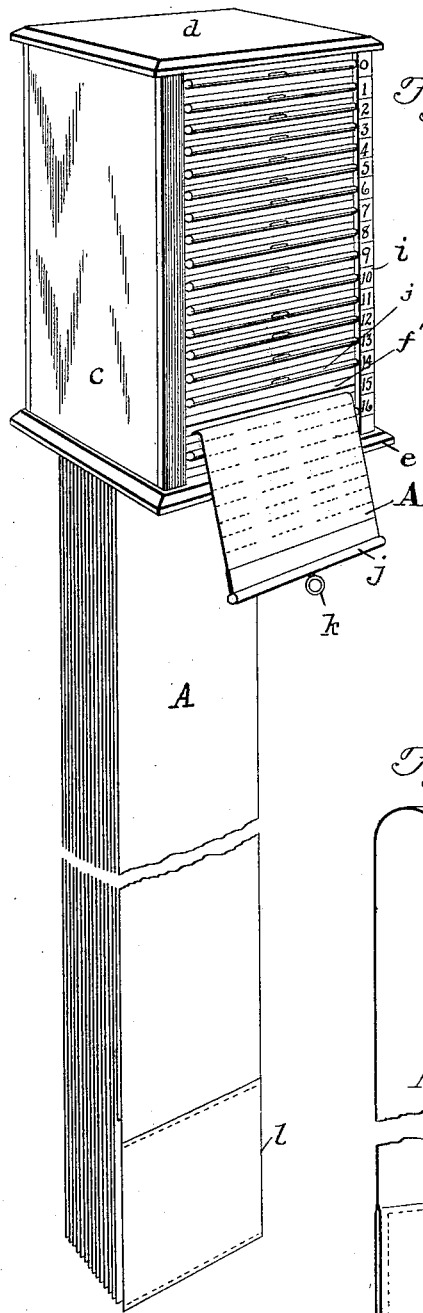
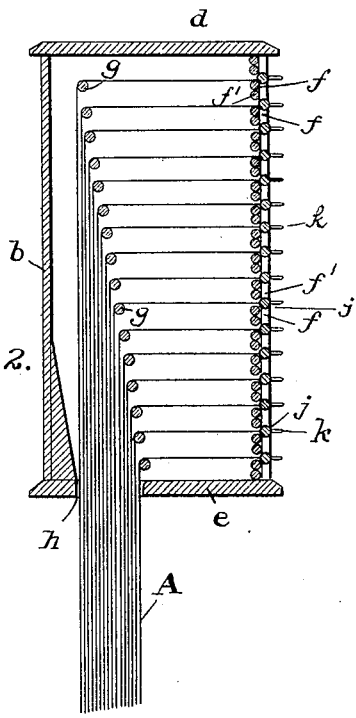
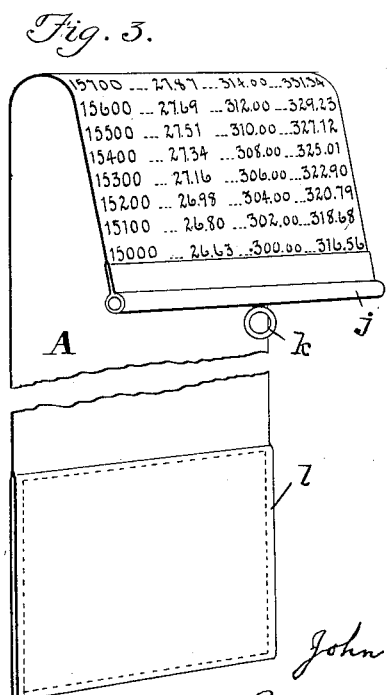
Witnesses:—
Lee J. Van Horn
Chafin A. Ferguson.
Inventor:—
John M. Pope
By Chas. B. Mann
Attorney.

UNITED STATES PATENT OFFICE.

JOHN M. POPE, OF BALTIMORE, MARYLAND.

TAX-BILL COMPUTATOR.

SPECIFICATION forming part of Letters Patent No. 614,274, dated November 15, 1898.

Application filed March 8, 1898. Serial No. 673,060. (No model.)

*To all whom it may concern:*

Be it known that I, JOHN M. POPE, a citizen of the United States, residing at Baltimore, in the State of Maryland, have invented certain new and useful Improvements in Tax-Bill Computators, of which the following is a specification.

This invention relates to a tax-computator which is particularly useful in tax-collectors' offices, and comprises a plural number of paper strips, each strip provided with printed columns of figures representing a different value series from the figures on the other strips, and a mechanical apparatus whereby any desired one of the strips may be drawn out without disturbing the other strips and any strip drawn out will be retracted automatically.

The invention is illustrated in the accompanying drawings, in which—

Figure 1 is a perspective view of the cabinet and strips complete. Fig. 2 is a vertical section of the cabinet and shows the arrangement of the computing-strips. Fig. 3 is a perspective view, on a larger scale, of a paper strip and shows the system of computations in columns.

Strips A, referred to and here described, are illustrative of and are part and parcel of my invention. They were made up to suit the needs and requirements of the tax department of the city of Baltimore for the year 1897. This department collects the State tax as well as the city tax. The State rate of taxation is seventeen and three-fourths cents per one hundred dollars, and the city tax rate is two dollars on the one hundred dollars. The State tax is subject to a five per cent. discount and plus a one-per-cent. commission to the collector for collection. The city tax is subject to a three-per-cent discount. It is the practice of the office to show both taxes in one total on all tax-bills.

In the present instance sixteen strips of paper three inches by twenty-eight inches, with printed computations arranged in columns in proper order, are shown. The first fourteen strips are arranged substantially alike and differ only in amounts or values. On No. 0 strip the first row or column of figures consists of amounts representing values of assessed properties. The amounts progress by five-dollar increases and run from "$5" up to "$995." The second row of figures consists of the gross State tax at the seventeen and three-fourths cents rate, placed opposite its respective property valuation in the first row. The third row of figures consists of the gross city tax, reckoned at two dollars on the one hundred dollars, each in order and directly opposite the State tax on the same property value. The fourth row gives the net totals of the tax-bill and consists of the State tax minus its five-per-cent. discount plus its one-per-cent. commission and includes the city tax minus its three-per-cent. discount, each total being opposite its respective State and city tax. These totals represent the net amount the taxpayer is to pay and the amount the cashier is to receive and the amount of the clerk's entry. The second strip of paper (No. 1) shows property values beginning with "$1,000" and extending by five-dollar increases to "$1,995," with their respective amounts of taxes and totals opposite, as in the No. 0 strip just described. On the third strip the property values run from "$2,000" to "$2,995," &c., on the fourth strip from "$3,000" to "$3,995," &c., and so on with the other strips up to and including the fourteenth strip, on which latter the values extend from "$14,000" to "$14,995."

The above strips described are applicable to ninety-five per cent. of the amounts given by any one individual as the value of properties in Baltimore city, and it is not deemed essential to have more than one more strip, No. 15, for the remaining five per cent. The values on this strip extend from "$15,000" up to "$100,000," progressing by one-hundred-dollar increases. In the event of a tax-bill containing a valuation of property which does not happen to be on the strip the total of the bill can easily be made by taking two amounts from the strips, which when added together will make the exact amount required.

The mechanical device for handling the strips consists of a cabinet ten inches high by five inches broad and five inches deep. The back *b* of the cabinet, the two sides *c*, the top *d*, and bottom *e* are closed. Across the front are horizontal wires or rollers *f f'*, arranged in pairs, an open slot being left between the two wires of each pair, through which slot a paper strip may be drawn out. A series of rollers or wires $g$ extend across from one side $c$ to the other and are arranged one above the other; but the series describe a line which inclines from a perpendicular. This series is directly over an opening or slot $h$ in the bottom $e$, down through which opening all the paper strips A extend. On one vertical margin of the front is a row of figures $i$, indicating the numbers of the paper strips from 0 at the top downward.

The upper end of each strip A has a cross-rod $j$ attached, and a suitable grasp device, like a ring $k$, is fixed thereto. The lower end of each strip has a weight $l$, attached in any suitable way. In the present instance the weight $l$ comprises a piece of sheet metal inclosed in a pocket formed by folding the paper strip and securing the fold by means of gum or paste. The paper strips are all arranged in the cabinet, as shown. The rod $j$ of each strip normally has position at the front in contact with the pair of wires $f f'$, the paper strip extending from its rod $j$ horizontally across to one of the rollers or wires $g$, and thence hangs down through the slot $h$ in the bottom, the weight $l$ at the lower end of the strip keeping the latter taut. From between the wires the paper strips are pulled out by the thumb-piece $k$ far enough to expose the value that is desired, and the other ends of the strips being weighted they will spring quickly back into place when the hand releases the thumb-piece. The same effect would be produced by attaching the inner ends of the strips to spring-rollers placed inside the cabinet and winding the strips thereon.

Where the cabinet sets on a desk, the strips must be allowed to pass down through a slit in the desk-top.

Having thus described my invention, what I claim is—

1. A tax-bill computator comprising a case provided with cross-slots and a side margin with a row of indicating-figures for said slots; a plural number of strips independent of each other each containing computations in columns extending lengthwise of the strip and an end of one strip projecting out from each of said cross-slots; a guide roller or wire over which each strip passes; and means connected with each strip for retracting it after it has been drawn out, whereby any one of the desired strips may be drawn out without disturbing either of the other strips.

2. A tax-bill computator, having in combination a cabinet provided at its front with horizontal slots and at its vertical margin with a row of indicating-figures for said slots; a plural number of strips containing computations—one strip projecting out from each slot and each strip capable of being drawn out; and means to retract the strips and keep them normally drawn in.

3. A tax-bill computator, having in combination a cabinet provided at its front with horizontal slots; a series of crosswise rollers or wires one above the other but in a line inclining from a perpendicular; a plural number of strips containing computations—one strip projecting from each slot and each strip capable of being drawn out; and a weight attached to the inner end of each strip to retract it.

In testimony whereof I affix my signature in the presence of two witnesses.

JOHN M. POPE.

Witnesses:
CHAPIN A. FERGUSEN,
CHARLES B. MANN, Jr.